United States Patent [19]

Satterwhite et al.

[11] 4,065,402

[45] Dec. 27, 1977

[54] TALL OIL DEFOAMER FOR HIGH STRENGTH ACID MEDIA

[75] Inventors: William A. Satterwhite, Englishtown; Robert M. Leach, Cranbury; Harold A. Stuhler, Browns Mills, all of N.J.

[73] Assignee: Cities Service Company, Tulsa, Okla.

[21] Appl. No.: 681,621

[22] Filed: Apr. 29, 1976

[51] Int. Cl.$^2$ ............................................. B01D 19/04
[52] U.S. Cl. ..................................... 252/358; 252/321
[58] Field of Search ............................... 252/321, 358; 423/321 R, 321 S

[56] References Cited

U.S. PATENT DOCUMENTS

| | | | |
|---|---|---|---|
| 2,668,150 | 2/1954 | Luvisi | 252/358 X |
| 2,797,198 | 6/1957 | Chappell | 252/358 |
| 3,086,944 | 4/1963 | Wedell | 252/321 X |
| 3,215,635 | 11/1965 | Liebling et al. | 252/358 X |
| 3,238,142 | 3/1966 | Perry | 252/358 |
| 3,751,373 | 8/1973 | Lieberman et al. | 252/358 X |

*Primary Examiner*—Benjamin R. Padgett
*Assistant Examiner*—E. Suzanne Parr
*Attorney, Agent, or Firm*—John W. Carpenter; Donald L. Traut

[57] ABSTRACT

A defoamer for controlling the foam in high strength acid media and process for preparing same having a majority of a sulfonated tall oil and minority of a long chain alcohol.

38 Claims, No Drawings

TALL OIL DEFOAMER FOR HIGH STRENGTH ACID MEDIA

BACKGROUND OF THE INVENTION

1. Field of the Invention

The invention is related to a surface active material, a defoamer. More particularly, this invention provides a defoamer and process for preparing same which controls the foam in high strength acid media from petroleum products.

2. Description of the Prior Art

Defoamers consist of sulfonated tall oil-fatty acids. Some are produced from a refined oleic acid while others are produced from tall oil. The primary application of these defoamers is in the phosphate industry to control the foam in the digestion and concentration stages of wet-process phosphoric acid manufacture. In recent years cost of defoamers has drastically increased because of the high cost of raw materials utilized in their manufacture. Therefore, what is needed and what has been invented by us is a novel defoamer which is not only low in cost but is also more effective than the conventional defoamers being marketed.

SUMMARY OF THE INVENTION

It is therefore an object of this invention to provide a defoamer and a process for preparing same.

It is yet another object of this invention to provide a defoamer which is economical to prepare and is more effective than conventional defoamers.

These and other objects will become apparent to those skilled in the art as the following description proceeds.

The foregoing objects are achieved in accordance with this invention. Broadly, this invention is a defoamer and process for preparing same for controlling the foam in high strength acid media from petroleum products which comprises a majority of a sulfonated tall oil and/or fatty acid and a minority of a long chain alcohol.

DETAILED DESCRIPTION OF THE INVENTION

The composition of matter of this invention is a defoamer for controlling the foam in high strength acid media which broadly comprises a majority of either a fatty acid, or a resin acid, or a tall oil and a minority of a long chain alcohol. The fatty acid may be mixed with resin acid. The mixture, generally known as tall oil (a by product from sulfate woodpulp digestion consisting mainly of resin acids and fatty acids), may contain from about 0.1 wt% to about 99.9 wt% of the resin acid. Therefore, the defoamer may also broadly comprise a majority of a resin, which preferably has been sulfonated, and a minority of a long chain alcohol. If the fatty acid or the resin acid is going to be utilized alone, in a preferred embodiment of the invention, the fatty acid is the most preferred.

As was previously mentioned, tall oil is the natural mixture of resin acids and of fatty acids (together with nonacetic compounds) which is obtained by acidifying the black liquor skimmings of the alkaline paper industry. Crude tall oil is refined by solvent extraction and/or distillation. The more refined the product, the higher the fatty acid content as shown in the following:

| Product | Fatty Acid (%) | Resin Acids (%) | Unsaponified (%) |
|---|---|---|---|
| Crude Tall Oil | 18 | 28 | 54 |
| Single Distilled | 90 | 6.5 | 2.7 |
| Double Distilled | 99 | 0.5 | 0.4 |

Tall oil by-products, such as tall oil heads and tall oil pitch, are also used as defoamers. Heads contain about 74.5 wt.% fatty acid, 25 wt.% resin acids, and 0.5 wt% unsaponified. Pitch contain approximately 34.0 wt% fatty acid, 36 wt.% resin acid, and 25.0 wt% unsaponified. These products are obtained from the still bottoms (crudes left over after refinement), and etc. The fatty acids are usually present as terpenes, esters; they can be either natural or synthetic, and may also be substituted with hydroxy or keto groups.

Fatty acids are a large group of organic, monobasic acids derived from hydrocarbons and may be saturated or unsaturated. In a preferred embodiment of the invention, the fatty acids are a large group of aliphatic monocarboxylic acid. The saturated fatty acids (e.g. formic, acetic, palmitic, stearic, oleic, etc.) have the emperial formula $C_nH_{2n+1}COOH$ where $n$ is an integer of from 1 to 38, or $C_nH_{2n}O_2$ where $n$ may have the same range of values. The unsaturated fatty acids have at least one double bond and may have the following emperical formulas: $C_nH_{2n-1}COOH$ or $C_nH_{2n-3}COOH$, or $C_nH_{2n-4}O_2$ (acetylene acids, sorbic acid, linoleic acid, etc); and $C_nH_{2n-5}COOH$ or $C_nH_{2n-6}O$ (linolinic acid, etc). In the foregoing emperical formulas for unsaturated acids $n$ may be between 2 and 40, more preferably, $n$ is between 10 and 30.

Resins are the oxidation or polymerization products of the terpenes, and consist of mixtures of aromatic acids and esters which are insoluble in water, soluble in alcohol, ether or essential oils. Rosin is the resin remaining after distilling trupentine from the exudation of various species of pine (e.g. pinus palustris). It contains from about 80 to 90 wt.% of abietic acid ($C_{20}H_{30}O_2$) and its anhydride.

The fatty acid, resin acid or tall oil is sulfonated by mixing it with a mixture of $SO_3$ and $SO_2$ at a temperature of between about $-20°$ F and $212°$ F. A preferred temperature is room temperature (i.e. about $72°$ F). The $SO_3$ is much too reactive alone; therefore, $SO_2$ is utilized to pacify the reaction. The $SO_2$ doesn't enter into the reaction of the $SO_3$ and oil but merely acts as a diluent and coolant for the strong oxidizing tendencies of the $SO_3$. The alcohol is used to disperse and/or dissolve the acid sludge. The alcohol not only disperses the sludge but also permits the formation of a synergistic product to produce a defoamer which is several fold more effective than the fatty acid, resin acid, tall oil or the sulfonate of these compounds or the alcohol alone. The alcohol may be any alcohol that is soluble in the sulfonated oil. Preferably the alcohol may be any straight or branched cycle or linear long chain alcohol having between about 4 and 20 carbon atoms. More preferably the alcohol has between about 8 and 14 carbon atoms. Most preferably the alcohol is dodecyl alcohol.

The sulfonation ratio of $SO_3$ to either fatty acid resin acid or tall oil may broadly be from about 0.025:1 to about 0.60:1. The more preferred sulfonation ratio of $SO_3$ to anyone of these compounds is from between about 0.1:1 to about 0.3:1, most preferably, the ratio is about 0.25:1.

The ratio of alcohol to either the fatty acid, resin acid, tall oil, or the sulfonate of anyone of these compounds may broadly be from about 0.025:1 to about 0.75:1. The more preferred ratio of alcohol to anyone of these compounds is from between about 0.25:1 to about 0.50:1; most preferably, the ratio is about 0.38:1.

In the process for preparing the defoamer the fatty acid, or the resin acid, or the tall oil is preferably sulfonated with a minority of $SO_3$ dissolved in a majority of $SO_2$. The mixing ratio of $SO_3$ to $SO_2$ may be any suitable ratio such that $SO_2$ quiesces the reactive $SO_3$. Preferably $SO_3$ and $SO_2$ are mixed in a ratio of from approximately 1:1 to about 1:10. During the course of the reaction of either the fatty acid, the resin acid, or the tall oil and the $SO_3$, $SO_2$ mixture, the temperature decreases. The mixture is preferably allowed to react from between about 15 minutes and 90 minutes whereafter the reacted product is a mixture of sulfonated fatty acid, a sulfonated resin acid, or a sulfonated tall oil (depending on starting compound), and an acid sludge. The alcohol is subsequently added to the sulfonated compound to disperse the sludge. After the admixing of the alcohol to the sulfonated compound, the mixture is blended from between about 15 mins. and 90 minutes. It should be noted that the 90 minute upper limitation on the reaction time of the compound and $SO_3$, $SO_2$ mixture, and the sulfonated compound and alcohol mixture is not to be construed as an unduly limitation. Longer reaction times would be superfluous because the reactions are completed after about 15 minutes.

In the following is set forth examples of our invention which are given by way of illustration and not by limitations. The specific concentrations, temperatures, times, compounds, etc., set forth in these examples are not to be construed to unduly limit the scope of the invention.

EXAMPLE 1

Four hundred grams of refined tall oil were sulfonated at room temperature with 130 gms of liquid $SO_3$ dissolved in 680 gms of liquid $SO_2$. During the course of the reaction, the temperature decreased to $-10°$ F. The mixture was allowed to react for 15 minutes at which time the temperature rose to 70° F. The product was then heated to 140° F to strip residual $SO_2$. The reacted product was a mixture of sulfonated tall oil and sludge. Dodecyl alcohol was added to the mixture to disperse the sludge. The alcohol was added in a ratio of 300 grams of alcohol to 530 grams of sulfonated tall oil. The mixture was blended for 30 minutes at 140° F. to insure complete dispersion of the sludge. An acceptable alternative is to add the alcohol along with the tall before sulfonation. The product was then neutralized to pH7 with caustic. Water added to neutralized sulfonate to produce a product containing about 40% sulfonate. Neutralization is not absolutely necessary in the preferred embodiment of the invention but is preferred for shipping purposes.

This defoamer was added periodically to a reactor having a continuous flow of phosphate rock, 60% $H_2SO_4$, and recycled phosphoric acid (25% $P_2O_5$) in order to control the foaming. This defoamer was proved to be superior to conventional defoamers on a cost/ton of $P_2O_5$ basis and defoamer requirements/ton of $P_2O_5$ as evidenced in the following Table I:

Table I

|  | Defoamer Requirements per ton $P_2O_5$ (lbs./ton) | Cost per Ton $P_2O_5$ ($) |
|---|---|---|
| Applicants' Defoamer | 2.59 | .58 |
| Conventional Defoamers |  |  |
| Brand A | 4.00 | 0.70 |
| Brand B | 2.87 | 0.65 |
| Brand C | 4.68 | 1.24 |
| Brand D | 6.62 | 1.16 |
| Brand E | 4.18 | 6.94 |
| Brand F | 9.60 | 1.63 |
| Brand G | 4.66 | 0.98 |

EXAMPLE 2

Four hundred grams of oleic acid were sulfonated at room temperature with 130 grams of liquid $SO_3$ dissolved in 650 grams of liquid $SO_2$. During the course of the reaction, the temperature decreased to 20° F. The mixture was allowed to react for 15 minutes at which time the temperature rose to 85° F. The product was then heated to 110° F to strip residual $SO_2$. The reacted product was a mixture of sulfonated oleic acid and acid sludge. Dodecyl alcohol was added to the product. The alcohol was added in a ratio of 250 grams alcohol to 530 grams of sulfonate. The mixture was agitated for 30 minutes to insure a homogenous product. The mixture is then preferably neutralized to pH7 with caustic. Enough water is added to the neutralized mixture to produce a product containing about 40% sulfonate. Subsequently the defoamer was tested and compared to conventional defoamers in accordance with Example I and similar results were found.

EXAMPLE 3

Four hundred grams of a tall oil product containing about 55% tall oil resins and about 40% polyterpenes were sulfonated at room temperature with 120 grams of liquid $SO_3$ dissolved in 600 grams of liquid $SO_2$. During the course of the reaction, the temperature dropped to $-0°$ F. The mixture was allowed to react for 15 minutes at which time the temperature of the mixture rose to 60° F after which the product is heated to 120° F to flush off any residual $SO_2$. The reacted product was a mixture of sulfonated tall oil and acid sludge. Dodecyl alcohol was added to the mixture to disperse the sludge. The alcohol was added in a ratio of 350 grams of alcohol to 520 grams of the sulfonate. The mixture was stirred at room temperature for 30 minutes to insure complete dispersion of the sludge. Subsequently the defoamer was tested and compared to conventional defoamers in accordance with EXAMPLE I and similar results were found.

EXAMPLE 4

Repeat Example I but substitute oleic acid for the tall oil, then substitute resin acid for tall oil, then substitute non-sulfonated oleic acid and non-sulfonated resin acid to be admixed with the alcohol, find similar results in all cases.

EXAMPLE 5

Repeat Examples 1-4, but vary the mixing ratios of $SO_3$ to the selected compound (fatty acid, resin acid, or tall oil) in 0.005 increments between 0.025 and 0.600 and find similar results.

EXAMPLE 6

Repeat Examples 1-5 but vary the type of alcohol (both straight chain and branched) linear or cyclic in 1 carbon atom increments between 4 carbon atoms and 20 carbon atoms and find similar results.

EXAMPLE 7

Repeat Examples 1-6 but vary the sulfonation temperature when sulfonating in increments of 5° F between −20° F and 212° F and find similar results.

EXAMPLE 8

Repeat Examples 1-6 but vary the mixing ratio of the alcohol to the sulfonated compound in increments of 0.005 between 0.025 and 0.750 and find similar results.

EXAMPLE 9

Repeat Examples 1-8 but vary the mixing ratio of the $SO_3$ to $SO_2$ when sulfonating in increments of 1:1 between 1:1 to 1:10 and find similar results.

EXAMPLE 10

Repeat Examples 1-9 but lower the reaction time of $SO_3$ and $SO_2$, and the agitation time of sulfonated compound and alcohol to 15 minutes and find similar results.

EXAMPLE 11

Repeat Examples 1-10 but vary $n$ in increments of 1 between 1 to 38 in the fatty acid having the formula $C_nH_{2n+1}COOH$, in the fatty acid having the formula $C_nH_{2n-1}COOH$, in the fatty acid having the formula $C_nH_{2n}O_2$, in the fatty acid having the formula $C_nH_{2n-1}COOH$ or $C_nH_{2n-3}COOH$ or $C_nH_{2n-4}O_2$ or $C_nH_{2-5}COOH$ or $C_nH_{2n-6}O$, find similar results in all cases.

EXAMPLE 12

Admixed the fatty acid of Example 11 (and repeat Examples 1-10) with resin acid, vary the wt% of resin acid in the fatty acid in increments of 5wt% between 0.1 wt% to 99.9 wt% and find similar results in all cases.

EXAMPLE 13

Take the sulfonated tall oil of EXAMPLE 1 and the alcohol of EXAMPLE 1 and test the defoamer requirements of each and synergistically compare with the defoamer of EXAMPLE 1. Find the following synergistic results:

Table 2

|  | Defoamer Requirements per ton $P_2O_5$ | Cost per ton $P_2O_5$ |
|---|---|---|
| Sulfonated tall oil | 7.52 | 1.88 |
| Alcohol | 6.03 | 1.20 |
| Applicants' Defoamer | 2.59 | 0.58 |

EXAMPLE 14

Repeat EXAMPLE 13 in accordance with each procedure of EXAMPLES 2-12 and find the similar results given in EXAMPLE 13.

While the present invention has been described herein with reference to particular embodiments thereof, and specific examples, a latitude of modifications, various changes and substitutions are intended in the foregoing disclosure, and in some instances some features of the invention will be employed with a corresponding use of other features without departing from the scope of the invention as set forth.

We claim:

1. A defoamer for controlling the foam in high strength acid media comprising a majority of a fatty acid and a minority of a long chain alcohol, said alcohol having from about 4 to about 20 carbon atoms, and the ratio of said alcohol to said fatty acid is from about 0.025:1 to about 0.75:1.

2. The defoamer of claim 1 wherein said fatty acid is sulfonated and comprises a formula of $C_nH_{2n+1}COOH$ where $n$ is an integer of from 1 to 38.

3. The defoamer of claim 1 wherein said fatty acid includes at least one double bond and comprises a formula of $C_nH_{2n-1}COOH$ where $n$ is an integer of from 10 to 30.

4. The defoamer of claim 3 wherein said fatty acid additionally comprises resin acid.

5. The defoamer of claim 4 wherein said resin acid comprises a majority of abietic acid having the formula $C_{20}H_{30}O_2$.

6. The defoamer of claim 5 wherein said fatty acid and resin acid mixture comprises from about .1 wt% to about 99.9 wt% of said resin acid.

7. The defoamer of claim 6 wherein said fatty acid comprises oleic acid having the formula $C_{18}H_{34}O_2$.

8. The defoamer of claim 1, wherein said fatty acid is sulfonated and comprises a sulfonation ratio of $SO_3$ to fatty acid of from approximately 0.025:1 to about 0.6:1.

9. The defoamer of claim 8, wherein said long chain alcohol comprises a branched chain alcohol of from approximately 8 carbon atoms to about 14 carbon atoms.

10. The defoamer of claim 8, wherein said long chain alcohol comprises a branched cyclic chain alcohol of from approximately 8 carbon atoms to about 14 carbon atoms.

11. The defoamer of claim 8, wherein said long chain alcohol comprises a linear alcohol of from approximately 8 carbon atoms to about 14 carbon atoms.

12. The defoamer of claim 8, wherein said fatty acid is sulfonated at a temperature of from between about −20° to about 212° F.

13. The defoamer of claim 12, wherein said ratio of said alcohol to said sulfonated fatty acid is from approximately 0.025:1 to about 0.50:1.

14. The defoamer of claim 8, wherein said $SO_3$ additionally comprises $SO_2$, said mixture of $SO_3$ and $SO_2$ being mixed in a ratio of from approximately 1:1 to about 1:10.

15. A process for preparing a defoamer for controlling the foam in high strength acid media comprising mixing a majority of a fatty acid and a minority of a long chain alcohol, said alcohol having from about 4 to about 20 carbon atoms, and the ratio of said alcohol to said fatty acid is from about 0.025:1 to about 0.75:1.

16. The process of claim 15 wherein said fatty acid is sulfonated and comprises a formula of $C_nH_{2n+1}COOH$ where $n$ is an integer of from 1 to 38.

17. The process of claim 15 wherein said fatty acid includes at least one double bond and comprises a formula of $C_nH_{2n-1}COOH$ where $n$ is an integer of from 10 to 30.

18. The process of claim 17 wherein said fatty acid additionally comprises resin acid.

19. The process of claim 18 wherein said resin acid comprises a majority of abietic acid having the formula $C_{20}H_{30}O_2$.

20. The process of claim 19 wherein said fatty acid and resin acid mixture comprises from about 0.1 wt% to about 99.9 wt% of said resin acid.

21. The process of claim 20 wherein said fatty acid comprises oleic acid having the formula $C_{18}H_{34}O_2$.

22. The process of claim 15, wherein said long chain alcohol comprises a linear alcohol of from approximately 8 carbon atoms to about 14 carbon atoms.

23. The process of claim 15 wherein said long chain alcohol comprises a branched chain alcohol of from approximately 8 carbon atoms to about 14 carbon atoms.

24. The process of claim 15, wherein said fatty acid is sulfonated and comprises a sulfonation ratio of $SO_3$ to fatty acid of from approximately 0.025:1 to about 0.6:1.

25. The process of claim 24 additionally including mixing $SO_2$ with said $SO_3$, said mixture of $SO_3$ and $SO_2$ being mixed in a ratio of from approximately 1:1 to about 1:10.

26. The process of claim 25, wherein said sulfonation is performed at a temperature of between about $-20°$ F. to about $212°$ F.

27. The process of claim 26, wherein said mixture of oil, $SO_3$, and $SO_2$ is allowed to react for at least 15 minutes.

28. The process of claim 27, wherein the ratio of said alcohol to said sulfonated fatty acid is from approximately 0.25:1 to about 0.50:1.

29. The process of claim 26 additionally comprising agitating said mixture of sulfonated fatty acid and alcohol for at least 15 minutes immediately after adding said alcohol to insure complete dispersion of the acid sludge resulting from sulfonation of the oil.

30. The process of claim 15, wherein said long chain alcohol comprises a branched cyclic chain alcohol of from approximatey 8 carbon atoms to about 14 carbon atoms.

31. A defoamer for controlling the foam in high strength acid media comprising a majority of a tall oil and a minority of a long chain alcohol, said alcohol having from about 4 to about 20 carbon atoms, and the ratio of alcohol to said tall oil is from about 0.025:1 to about 0.75:1.

32. The defoamer of claim 31 wherein said tall oil is sulfonated and comprises a sulfonation ratio of $SO_3$ to tall oil of from approximately 0.025:1 to about 0.6:1.

33. The defoamer of claim 32, wherein said long chain alcohol comprises a branched chain alcohol of from approximately 8 carbon atoms to about 14 carbon atoms.

34. The defoamer of claim 32, wherein said long chain alcohol comprises a branched cyclic chain alcohol of from approximately 8 carbon atoms to about 14 carbon atoms.

35. The defoamer of claim 32, wherein said long chain alcohol comprises a linear alcohol of from approximately 8 carbon atoms to about 14 carbon atoms.

36. The defoamer of claim 32, wherein said tall oil is sulfonated at a temperature of from between about $-20°$ to about $212°$ F.

37. The defoamer of claim 36 wherein said ratio of said alcohol to said sulfonated tall oil is from approximately 0.25:1 to about 0.50:1.

38. The defoamer of claim 32, wherein said $SO_3$ additionally comprises $SO_2$, said mixture of $SO_3$ and $SO_2$ being mixed in a ratio of from approximately 1:1 to about 1:10.

* * * * *

UNITED STATES PATENT OFFICE
CERTIFICATE OF CORRECTION

Patent No. 4,065,402            Dated December 27, 1977

Inventor(s) William A. Satterwhite, Robert M. Leach and Harold A. Stuhler

It is certified that error appears in the above-identified patent and that said Letters Patent are hereby corrected as shown below:

Col. 3 Line 56 reads "water added to neutralized" should read
-- water was added to neutralized --

Col. 5 Line 35 reads "$C_nH_{2-5}COOH$ or" should read
-- $C_nH_{2n-5}COOH$ or --

Col. 8 Line 9 reads "ratio of alcohol" should read
-- ratio of said alcohol --

Signed and Sealed this

Thirteenth Day of June 1978

[SEAL]

Attest:

RUTH C. MASON
*Attesting Officer*

DONALD W. BANNER
*Commissioner of Patents and Trademarks*